A. MASSON & W. M. WALLACE.

BEATING ENGINE USED IN THE MANUFACTURE OF PAPER.

APPLICATION FILED JAN. 31, 1911.

Reissued May 16, 1911.

13,241.

3 SHEETS—SHEET 1.

INVENTOR

Andrew Masson

William Morgan Wallace

BY Cyrus N. Anderson

ATTORNEY

WITNESSES

Daniel Webster, Jr.

Carrie E. Kleinfelder.

A. MASSON & W. M. WALLACE.

BEATING ENGINE USED IN THE MANUFACTURE OF PAPER.

APPLICATION FILED JAN. 31, 1911.

Reissued May 16, 1911.

13,241.

3 SHEETS—SHEET 2.

INVENTOR

Andrew Masson
William Morgan Wallace

BY Cyrus Nelson
ATTORNEY

WITNESSES

Daniel Webster, Jr.
Carrie E. Kleinfelder

A. MASSON & W. M. WALLACE.

BEATING ENGINE USED IN THE MANUFACTURE OF PAPER.

APPLICATION FILED JAN. 31, 1911.

Reissued May 16, 1911.

13,241.

3 SHEETS—SHEET 3.

INVENTOR

Andrew Masson

William Morgan Wallace

BY Cyrus N. Anderson

ATTORNEY

WITNESSES

Daniel Webster, Jr.

Carrie E. Kleinfelder.

UNITED STATES PATENT OFFICE.

ANDREW MASSON, OF PUTNEY, ENGLAND, AND WILLIAM MORGAN WALLACE, OF DENNY, SCOTLAND.

BEATING-ENGINE USED IN THE MANUFACTURE OF PAPER.

13,241. Specification of Reissued Letters Patent. Reissued May 16, 1911.

Original No. 957,894, dated May 17, 1910, Serial No. 517,126. Application for reissue filed January 31, 1911. Serial No. 605,806.

*To all whom it may concern:*

Be it known that we, ANDREW MASSON and WILLIAM MORGAN WALLACE, subjects of the King of England, and residents of Putney, England, and Denny, Stirlingshire, Scotland, respectively, have invented Improvements in Beating-Engines Used in the Manufacture of Paper, of which the following is a specification.

This invention relates to an improvement in beating engines used in the manufacture of paper, and has for its object to enable the roll to be more conveniently adjusted and set in relation to the beater bed plate or plates, so as to operate with desired pressure on the stuff being treated, than is obtainable with existing means, and to enable such pressure to be more readily and more exactly determined, and, to this end, the improvement is characterized by so mounting the roll that it is subject to oppositely acting means, one of which counter-balances the roll, and, when acting alone, serves to support the roll clear of the bed plate, and the other of which, when brought into operation, serves, by the application of readily controlled and exactly-indicated fluid pressure, to cause the roll to operate on the stuff with any desired and known-to-be-correct pressure, up to or exceeding its weight according to the measure of the application of the fluid pressure.

Figure 1:
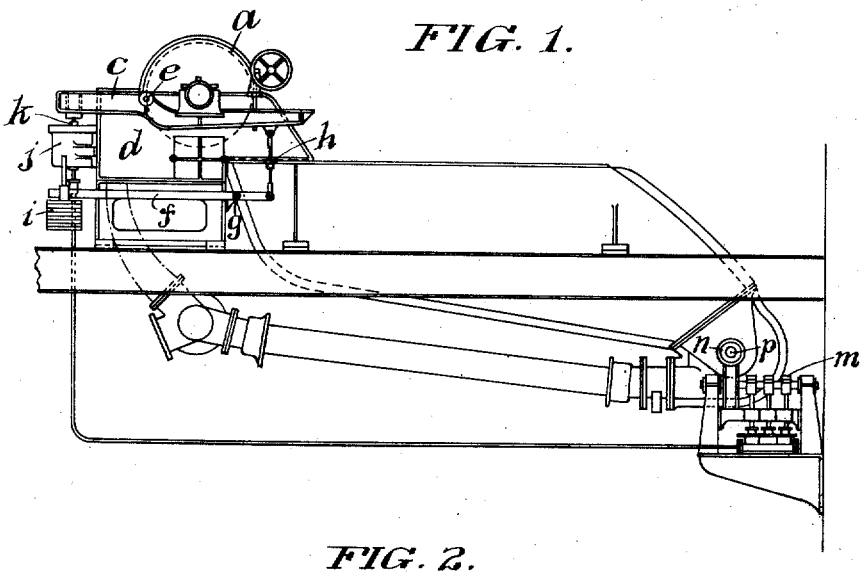
Figure 2:
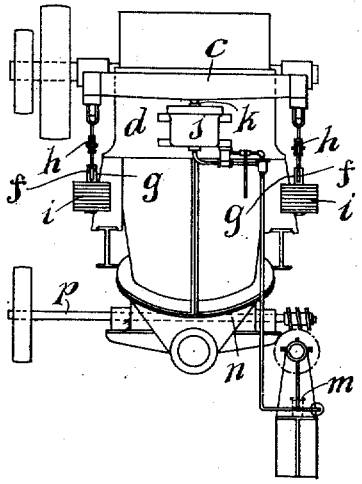
Figure 3:
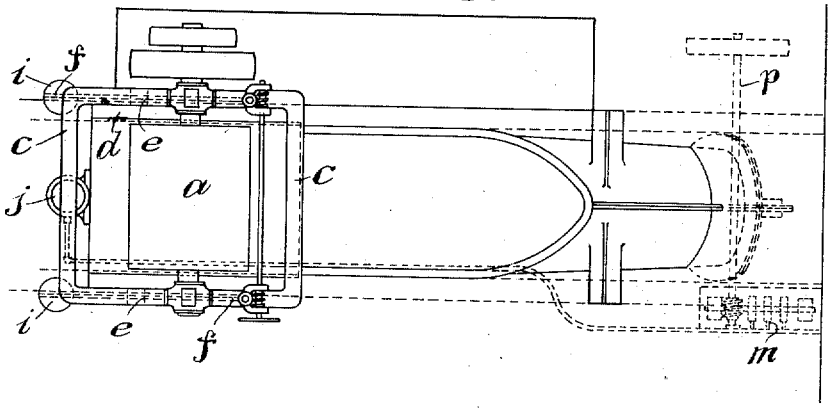
Figure 4:
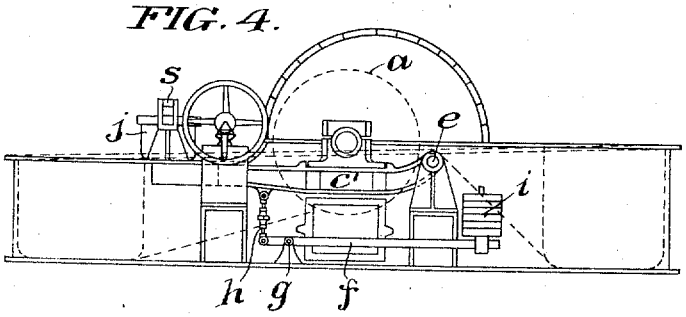
Figure 5:
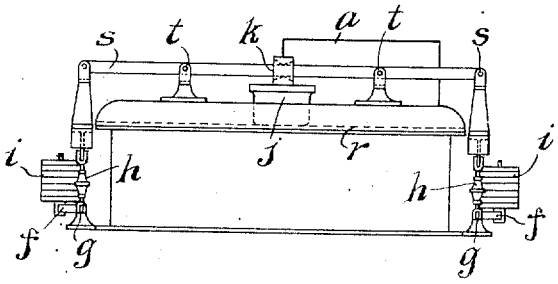
Figure 6:
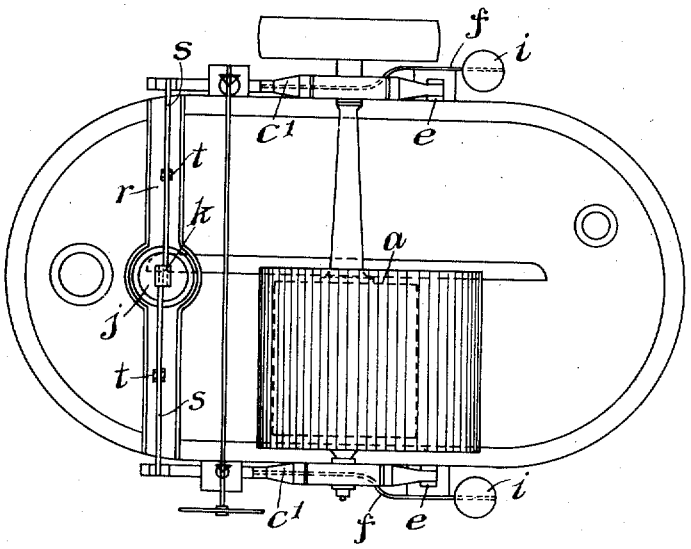
Figure 7:
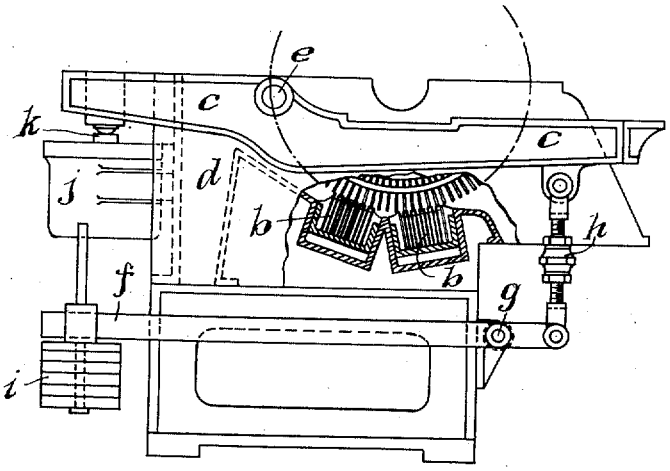

The accompanying drawings represent, by way of example, two applications of the invention to known constructions of beaters. Figures 1 to 3, representing, in side and end elevations and plan, what is known as the Taylor beater, and Figs. 4 to 6, representing, in side and end elevations and plan, what is known as the Hollander beater. Fig. 7, represents in side elevation detached and on an enlarged scale, the combination of counter-balancing and counter-balance counteracting or pressure giving means represented in Figs. 1 to 3.

In the arrangement represented in Figs. 1 to 3 and 7, the roll *a* is mounted in proper relation to the bed plate or plates *b*, which roll is supported on the sides of a frame *c* which surrounds the casing *d* of the beater. The frame is centered or pivotally supported at *e* on the sides of the casing *d* at points between the roll and one end of the casing. The frame *c* is connected to or is adapted to be operated on by the counter-balancing means and the pressure giving means respectively on opposite sides of the said center or pivotal point *e*. The counter-balancing means consists of levers *f*, centered or pivoted at *g*,—one lever at each side of the casing of the beater, each of the said levers being linked at one end, as at *h*, to the adjacent end of the frame *c* and said levers carrying at their other or opposite ends counter-balance weights *i*. The pressure giving means is shown as consisting of a hydraulic cylinder *j*, having a ram *k* adapted on the admission of pressure to the cylinder to act on the end of the frame *c* opposite to that on which the counter-balance weights *i* are adapted to operate, so as to cause the roll to bear on the bed plates *b* with any desired pressure up to or exceeding its weight as may be required,—the fluid pressure means being fitted with a pressure indicator (not shown), to enable the pressure of the roll to be exactly and easily determined.

Pressure for operating the ram may be derived from a pump *m* coupled to the pulp circulator *n* of the beater and to a suitable fluid supply so that in the event of the pulp circulator failing to operate on account, say, of the breaking of the driving belt which connects the pulley on the shaft of the roll *a* and the pulley on the circulator shaft *p* or the breaking of the latter shaft, the pressure in the cylinder *j* will at once fall off and allow the counter-balancing means *i*, uncounteracted by the pressure giving means, to support the roll clear of the bed plates.

In the arrangement represented in Figs. 4 to 6, the respective counter-balancing and pressure giving means are adapted to operate oppositely on the same end of the roll, carrying levers *c'*, which, at the other end, are centered or pivoted at *e* to the sides of the casing of the beater,—the cylinder *j* being carried by a cross-bar *r* supported by the sides of the casing; and the ram *k* of said cylinder operating on the levers *c'* by means of levers $s$ which are centered or pivoted at $t$ to the bar $r$, so that pressure by the ram $k$ causes the levers $s$ to operate on the roll carrying levers $c'$ in counteraction to the operation of the levers $f$ on the said roll carrying levers $c'$.

The invention is also of advantage in enabling the bed plate or plates to be rigidly secured in position, thus also obviating the disadvantages incidental to the employment of hydraulic cushions or other means for adjusting the bed plate or plates in relation to the roll.

Having thus described our invention, we claim:—

1. In a beating engine, the combination of a roll and means comprising a cylinder and a fluid pressure actuated device in said cylinder in operative relation to said roll for adjustably supporting said roll and controlling the pressure exerted thereby.

2. In an apparatus of the character described, the combination of a bed plate, a roll, and means comprising hydraulic cylinder and ram for supporting said roll in adjustable relation to said bed plate.

3. In an apparatus of the character described, the combination of a stationary bed plate, a roll, and means comprising hydraulic mechanism including a ram operating in a cylinder for movably supporting said roll in relation to said bed plate, the pressure of the said roll upon the material treated in the said apparatus being controlled by the said mechanism.

4. In an apparatus of the character described for the manufacture of paper, the combination of a casing, a roll in said casing, and means for varying the pressure of the roll upon the stuff which is being treated in the said casing, which means comprises a device which exerts a constant force upon said roll and tends to cause movement thereof in one direction and a fluid pressure actuated device operatively related to and adapted to exert a force in the opposite direction upon said roll, which force may be varied and controlled, whereby the pressure of the said roll may be varied and controlled.

5. In a beating engine, the combination of a roll and means separate from the roll and operatively related thereto for exerting oppositely acting forces upon said roll for the purpose stated, the said means comprising a fluid pressure actuated device.

6. In an apparatus of the character described, the combination of a casing, a bed plate in said casing, a roll, means in operative relation to said roll for causing movement of the same toward said bed plate, and means in operative relation to said roll and exerting a force thereon and causing or tending to cause movement of said roll away from said bed plate, one of said means comprising a fluid pressure actuated device.

7. In an apparatus of the character described, the combination of a casing, a roll, means in said casing for co-acting with said roll upon the "stuff" being treated in said casing, pivoted means for supporting said roll in operative relation to the means in said casing for co-acting with said roll, and mechanism separate from said roll for exerting oppositely acting forces upon said pivoted means whereby the pressure of the roll may be varied and controlled, said mechanism comprising a device actuated by fluid pressure.

8. In an apparatus of the character described, the combination of a casing, a roll, a pivoted frame on which said roll is supported, pivoted levers respectively having connection at one end with the said frame upon one side of its pivot, and the opposite ends of the said levers being provided with weights, and fluid pressure actuated means operating upon the said frame to exert a force thereagainst in opposition to the force exerted by the said weights, whereby the pressure exerted by the said roll may be controlled.

9. In an apparatus of the character described, the combination of a roll, a weighted lever having operative connection with the said roll and operating and tending to cause movement of the said roll in one direction and a fluid pressure actuated device operating and tending to cause movement of the said roll in the opposite direction.

10. Improvements in beating engines used in the manufacture of paper, comprising in combination, a frame carrying the roll and being centered on the casing sides, levers linked to one end of said frame, counterbalance weights carried by said levers, a ram acting on the other end of said frame, a hydraulic cylinder containing said ram and a pump, said pump being coupled to the pump circulator and furnishing the pressure for operating the ram, substantially as described and shown, and for the purpose set forth.

11. Improvements in beating engines used in the manufacture of paper, comprising in combination, levers $c'$, said levers carrying the roll, a second pair of levers $f$, counterbalance weights carried by the latter, said levers $f$ being linked to said levers $c'$, a third pair of levers $s$, the latter being linked to the levers $c'$, a ram acting on the former, a cylinder carrying said ram and a cross bar supported by the casing sides, the pressure of the ram causing the levers $s$ to operate in counteraction to the levers $f$, on the roll carrying levers $c'$, substantially as described and shown, and for the purpose set forth.

12. In a beating engine for the manufacture of paper, the combination of a receptacle for holding the "stuff" from which paper is manufactured, a movably supported roll in said receptacle, means in operative relation to said roll and exerting constant force in one direction thereon, and a fluid pressure actuated device in operative relation to said roll and adapted to exert a variable force in the opposite direction thereon, which force may be varied and controlled so that it may be greater or less than the first-named force, whereby the pressure of the roll may be varied and controlled.

13. In a beating engine for the manufacture of paper, the combination of a receptacle for holding the stuff from which the paper is manufactured, a movably supported disintegrating roll in said receptacle, counter-balancing means for the weight of said roll, and an additional means in operative relation to said roll which additional means is adapted to positively exert a variable force upon said roll in opposition to said counter-balancing means which force may be varied and controlled so that it may be greater or less than the counter balancing force, whereby the pressure of the roll upon the stock may be varied and controlled.

In testimony whereof we have hereunto set our hands in the presence of the subscribing witnesses.

ANDREW MASSON.
WILLIAM MORGAN WALLACE.

Witnesses to the signature of Andrew Masson:

R. WESTACOTT,
HERBERT D. JAMESON.

Witnesses to the signature of William Morgan Wallace:

JOHN ROBERTSON LANDER,
HARMON O. ACUFF.